United States Patent
Johnson et al.

[19]

[11] Patent Number: 6,163,338
[45] Date of Patent: Dec. 19, 2000

[54] APPARATUS AND METHOD FOR RECAPTURE OF REALTIME EVENTS

[76] Inventors: Dan Johnson, 4719 Mile High Dr., Provo, Utah 84604; Romer D. Johnson, 2440 W. Placita Iglesia, Tucson, Ariz. 85745

[21] Appl. No.: 09/130,787

[22] Filed: Aug. 7, 1998

Related U.S. Application Data

[63] Continuation-in-part of application No. 08/988,613, Dec. 11, 1997, abandoned.

[51] Int. Cl.[7] .............................. H04N 7/18; H04N 9/47
[52] U.S. Cl. ........................................ 348/148; 348/143
[58] Field of Search ..................... 348/148–149, 348/151–153, 143, 155–156; 701/29, 35, 36

[56] References Cited

U.S. PATENT DOCUMENTS

| | | | |
|---|---|---|---|
| 3,781,824 | 12/1973 | Caiati et al. ............................ | 346/33 |
| 4,558,379 | 12/1985 | Hütter et al. ............................ | 360/32 |
| 4,638,289 | 1/1987 | Zottnik ..................................... | 246/45 |
| 5,388,045 | 2/1995 | Kamiya et al. ......................... | 701/35 |
| 5,521,633 | 5/1996 | Nakajima et al. ...................... | 348/118 |
| 5,526,269 | 6/1996 | Ishibashi et al. ....................... | 701/29 |
| 5,541,590 | 7/1996 | Nishio ..................................... | 340/903 |
| 5,559,496 | 9/1996 | Dubats .................................... | 340/539 |
| 5,574,443 | 11/1996 | Hsieh ...................................... | 340/901 |
| 5,612,686 | 3/1997 | Takano et al. .......................... | 340/903 |
| 5,638,273 | 6/1997 | Coiner et al. ........................... | 701/35 |
| 5,677,979 | 10/1997 | Squicciarini et al. .................. | 386/46 |
| 5,680,123 | 10/1997 | Lee ......................................... | 340/937 |
| 5,706,362 | 1/1998 | Yabe ....................................... | 382/103 |
| 5,825,412 | 10/1998 | Hobson et al. ......................... | 348/149 |
| 5,896,167 | 4/1999 | Omae et al. ............................ | 348/149 |
| 6,002,326 | 12/1999 | Turner .................................... | 340/426 |
| 6,008,841 | 12/1999 | Charlson ................................ | 348/148 |

Primary Examiner—Vu Le
Attorney, Agent, or Firm—Thorpe, North & Western, LLP

[57] ABSTRACT

An apparatus and method for providing a video or audio record of a predetermined activity close in time to a preselected triggering event comprising a video or audio detection apparatus, control circuitry for developing a stream of electronic data representing a continuous sequence of audio or video images in real time, a circular data storage buffer for receiving the data in real time, an event detection mechanism for sensing occurrence of the predetermined triggering event so as to cause the control circuitry to freeze the contents of the circular buffer at some time adjacent to the occurrence of the triggering event, and means for downloading the stored data to a means for perceiving it such as a personal computer.

20 Claims, 3 Drawing Sheets

APPARATUS AND METHOD FOR RECAPTURE OF REALTIME EVENTS

This application is a continuation-in-part of U.S. patent application Ser. No. 08/988,613, filed on Dec. 11, 1997 now abandoned.

BACKGROUND OF THE INVENTION

1. Field of the Invention

This invention relates to capture and recording of unpredictable realtime events. More particularly, the present invention relates to capturing video or audio recordings of realtime events by means of a triggered solid state electronic recording device for electronically recording video images and/or sound for a continuously progressing defined time period that becomes fixed upon the detection of a triggering event.

2. State of the Art

There are a wide variety of events, both natural and man-caused, which are difficult to record in real time because they are difficult or impossible to predict. Such events include, for example, a lightening strike, an accident, the jump of a fish in a pond, a meteor, an avalanche, an earthquake, weather events, a robbery or other crime event, a sudden comment or statement of someone nearby, a gunshot, an explosion, low flying aircraft, an excessively noisy automobile, and so forth. These events are difficult to record because they are usually sudden or unexpected.

There are methods of making audio and video recordings of some of these types of events. For example, banks and other businesses routinely use video surveillance in case of robbery or other emergencies. Commercial airliners incorporate cockpit voice and data recorders. Police cruisers frequently contain video cameras. However, the current methods generally involve placing recording means near the expected site of the event, and continuously recording for an extended period of time until the event occurs. For extremely widespread events, such as earthquakes or accidents, this approach is impractical and costly, because it requires continual maintenance, support, and supervision of the recording equipment over a long period of time. For other applications, such as in automobiles, the required equipment may be impractically bulky or unsightly, or require excessive maintenance.

Traditional methods are also cumbersome and expensive due to the amount of storage media required, even when newer solid state imaging technology is employed. For example, in the case of security surveillance, current methods involve placing a video camera and recorder in a particular location and then frequently changing tapes, disks, or memory cards. Tapes and disks are bulky to store, and memory cards for solid state imaging systems are typically the most expensive component. Then, once the event occurs, significant effort is usually required to review the entire recording—perhaps many hours or days long—to locate the desired event. This is true even with devices that incorporate recording loops that continuously record over the same portion of recording media or memory. Furthermore, traditional surveillance devices require a person to physically see or otherwise become aware that the event has occurred in order to retrieve the tape, disc, or other storage media and search for the recorded event. Consequently, typical surveillance cameras cannot be left totally alone.

The need for a simple, reliable, and inexpensive method for recording real time events is clearly demonstrated in the context of automobile accidents. Thousands of automobile accidents occur every day, resulting in tens of thousands of deaths and personal injuries, and billions of dollars in property damage and health care costs each year. As a result, excessive resources are spent every year on insurance claims, investigations, and litigation. Many of these cases involve detailed and expensive accident reconstruction in an attempt to determine what actually happened. In the end, the determinations are often inconclusive.

Everyone involved would benefit greatly if there were a device that recorded actual sound or video footage of the few seconds just before and/or after an unexpected event, such as a collision, including an image of the actual moment of impact. Normally only a few relevant frames of image data are required to fully characterize an accident. Thus, only a small amount of image data would be extremely valuable. Such a device would be of great benefit to accident investigations, and greatly clarify the accident with respect to insurance claims and litigation, and also help prevent insurance fraud. Medical doctors may also gain a better idea of what happened from such a device, and be more aware of what injuries they should look for.

There are also many times when it would be desirable to have sudden or unexpected aural events or information recorded for immediate replay. For example, at times it may be desirable to have a paging announcement, names, telephone numbers, instructions, verbal agreements, or other messages repeated, but it may be embarrassing or impossible to do so. For hearing impaired persons in particular, some of these situations are especially common. To solve these problems it would be helpful to have a device allowing immediate selective recall of previous time periods of sound.

For these and other similar realtime events there is a genuine need for a practical, simple, inexpensive, convenient, and reliable method of capturing sudden or unexpected occurrences. Such a recording device may be advantageously triggered by the event itself, and create an audio or video recording of some desired window of time surrounding the event. In other cases, it would be desirable for the device to be selectively triggered by the user. Before the apparatus is triggered, the window of recorded time progressively advances, and upon occurrence of the event or selective triggering of the device, the window becomes fixed, the event is recorded, and recording stops until the device is reset, allowing downloading of the data from the device to means for perceiving it such as a computer or video monitor.

OBJECTS AND SUMMARY OF THE INVENTION

It is therefore an object of the present invention to provide an effective, reliable, and low cost device for recording sudden or unexpected realtime events, preferably triggered by the event itself.

It is another object of this invention to provide a device for making a video recording of sudden or unexpected realtime events.

It is another object of this invention to provide a device for making an audio recording of sudden or unexpected realtime events.

It is another object of this invention to provide a means for recording sudden or unexpected realtime events that is resistant to the shock, trauma, or other hazard expected to be associated with the event.

It is another object of this invention to provide a secure means for recording sudden or unexpected realtime events wherein the electronics are designed to prevent tampering with or unauthorized access to the contents of the memory following the event.

It is yet another object of this invention to provide an apparatus for recording video images of sudden or unexpected realtime events in a manner that the images may be downloaded to a personal computer via a standard serial interface or to a television monitor via a coaxial cable, and where the apparatus never needs to be opened, serviced, or removed from its place of installation.

The above and other objects are realized in an apparatus and method for providing a video or audio record of a predetermined activity close in time to a preselected triggering event comprising a video or audio detection apparatus, control circuitry for developing a stream of electronic data representing a continuous sequence of audio or video images in real time, a circular data storage buffer for receiving the data in real time, an event detection mechanism for sensing occurrence of the predetermined triggering event so as to cause the control circuitry to freeze the contents of the circular buffer at some time adjacent to the occurrence of the triggering event, and means for downloading the stored data to a means for perceiving it such as a personal computer.

In a preferred embodiment, accelerometers are used in the apparatus which is installed in a motor vehicle such that a collision involving the vehicle is the triggering event. Alternatively, the apparatus could be designed such that a sudden loud noise indicative of a collision involving a vehicle is the triggering event. Multiple units may also be installed in a motor vehicle and oriented in different unique directions so as to make a video record of the events surrounding the accident from multiple viewpoints. The data record of a vehicle accident may also include other information representing traffic flow within the vicinity of the vehicle, or the operational parameters of the vehicle, such as speed, brake usage, activation of turn signals, and so forth, during the time of the recording.

Other objects and features of the present invention will be apparent to those skilled in the art, based on the following description, taken in combination with the accompanying drawings.

DETAILED DESCRIPTION OF THE PREFERRED EMBODIMENT

Figure 1:
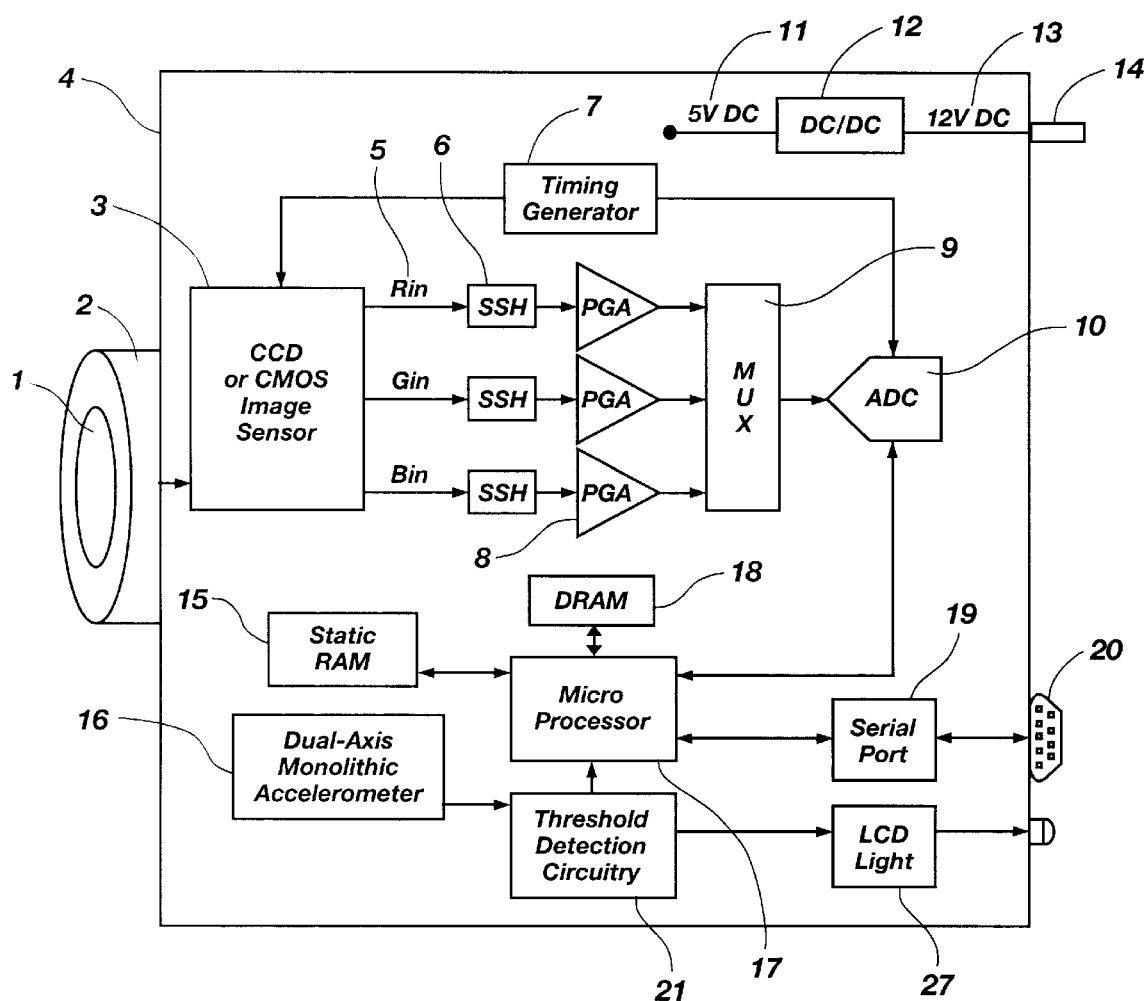
FIG. 1 provides a block diagram of the circuitry of the present invention incorporating an accelerometer.

Referring now to the drawings:

FIG. 1 provides a block diagram of the solid state circuitry of one embodiment of the present invention incorporating an accelerometer for detecting a vehicle collision. A camera lens 1 with a camera focus adjust 2 is connected to a CCD or CMOS image sensor 3. The lens 1 and focus adjust 2 are both standard components which are responsible for providing a clear picture to the image sensor 3. It will be appreciated that a lens with a fairly wide angle will be desirable to record as much information as possible.

Recent advances in charge-coupled devices (CCD's) and digital image sensor technology help make this invention possible. A CCD is a solid state chip for capturing images, which basically operates by collecting photocharge in pixels and then clocking them into a charge sensitive amplifier. There are many different kinds. For example, "interline" CCD's use a line of photodiodes to collect the charge. The device then produces a stream of pixel-by-pixel analog signals as output, which can be converted back into a video image. CCD devices provide excellent dynamic range and dynamic response. In the past 5 years CMOS image sensors have also become practical. CMOS image sensors are typically lower power and lower cost than CCD image sensors, and are capable of providing high-resolution, low-noise images that compare with CCD quality. These solid state image sensors have become very affordable and are increasingly integrated into small mass produced chips. Soon, complete CCD or CMOS systems will be available on a singe chip.

In FIG. 1, the image sensor 3 is connected to a timing generator 7 which controls when the images are to be taken. The image sensor 3 has a plurality of outputs 5 which are all simultaneously sampled by the Simultaneous Sample and Hold (SSH) circuitry 6. It will be appreciated that using different types of image sensors and different types of processors would naturally affect this block diagram. In the case of a color image sensor, there are generally three such image sensor outputs 5 which are for red, green and blue data. If it were a grayscale image device, then there would only be one sensor output. With multiple outputs an SSH circuit 6 is required if only one analog-to-digital converter (ADC) 10 is going to be used. This way, signals that were taken simultaneously may be digitized one at a time. Otherwise, three relatively expensive ADC's would be required. Connected to the SSH 6 is a programmable gain array (PGA) 8 which amplifies the signal up to a range which will utilize the full dynamic range of the ADC 10. A multiplexer 9 is placed in front of the ADC 10 so that all three signals may be read into the ADC one at a time. The timing generator 7 is also connected to the ADC and determines when the ADC will convert the analog signal(s) to digital data.

The sensor outputs 5, SSH circuits 6, timing generator 7, PGA 8, multiplexer 9, and ADC 10 are collectively referred to as the CCD or CMOS interface circuitry. Since there are many different versions of both CCD and CMOS image sensors on the market today, the interface circuitry to them may vary considerably. In the preferred embodiment, most or all of the image sensor interface circuitry is contained on a single chip. There are many such chips currently available on the market today which would be suitable for the present invention, such as the TLC8144 CCD interface device made by Texas Instruments Corporation.

A microprocessor 17 controls the ADC 10 and runs a program which continually reads the digitized image from the ADC and places it into non-volatile memory. Non-volatile memory means that when power is lost (which would be likely following a severe collision) the contents that are stored in the memory are not lost. In the preferred embodiment high speed static RAM 15 provides the non-volatile memory. Some dynamic random access memory (DRAM) 18 is connected to the microprocessor to hold the program that the microprocessor 17 is running. Many newer microprocessors have their own DRAM built in. Many newer ones also have a one time programmable read only memory (OTPROM) or flash memory built into them to store the executable code when the unit is powered down.

The great benefit of the above described configuration is the method by which only a small amount of memory is used to permanently record the dozen or so relevant graphical images of a collision. The non-volatile memory 15 contains a small circular buffer. For the purpose of illustration, it will be assumed that there is only enough static RAM (non-volatile memory) present to store, for example, thirty images from the image sensor 3. The program running in the microprocessor 17 will continually store images into the static RAM at a constant rate. For purposes of illustration, suppose that is five times per second. Once the device has been activated, the small amount of static RAM will be quickly filled up by images. In the example here, a thirty image capacity divided by five images per second means that in six seconds the static RAM would be full. However, once this happens the program will start overwriting the older images with newer ones. This method of memory usage where the older data is constantly being overwritten by newer data is known as a circular buffer. At any given moment, the most recent data (thirty images in this example) will be stored in memory and all previous data will be permanently lost (since it was overwritten). Once the program detects that a collision has occurred, recording may stop, or it continues (if possible) taking enough images to fill up about one-third of the total memory capacity (ten in this example), depending on the programming, and then no more images are recorded and the process is shut down. This way, the memory will now be divided up between the images before and after the collision (twenty before and ten after for the example above). In this way both the immediate cause and the resultant damage from the collision should be recorded in non-volatile memory. After the collision event has occurred, the processor will lock the contents of the memory from being overwritten.

It will be appreciated that the time frame of the saved data will depend on the amount of data saved in the circular data storage buffer and the frequency of image sampling, and may be any desirable time frame such as five minutes or three minutes or thirty seconds. Additionally, the scope of the time frame relative to the triggering event will vary depending on the application, and may be made selectively variable by a user. For most applications it is desirable that the unpredictable event itself be the triggering event, and that the recorded window of data be either substantially before or substantially after the triggering event. For example, the apparatus could be attached to a seismometer so that detection of an earthquake is the triggering event, and the desired window of recording may include just a few seconds before the initial detection of the earthquake, but several minutes afterward. Alternatively, photo sensitive detection means could be employed so that detection of a strike of lightening is the triggering event. In this embodiment the desired time frame may include just a few seconds before and a few seconds after the strike of the lightening, recorded at a very high frequency for very high resolution. In these and other similar embodiments the apparatus of the present invention may also include power supply means to allow long term placement in remote locations. The apparatus may also include locator means such that it can be found after an event which displaces it. For example, if the device were placed in a remote location to record a possible avalanche, and were subsequently buried by an avalanche, the locator means would allow searchers to quickly retrieve the device and gain access to its contents.

It will be appreciated that memory storage methods other than using a circular buffer to store the continual stream of image data may be used to accomplish the same end. One such alternative method is to use alternating banks of memory. This method is very similar to a circular buffer except that when using alternating banks of data, when one bank is full, the next one is used. Then when the second is full, the data goes back into the first bank and starts overwriting it.

It will also be appreciated that the microprocessor 17 used to run the software algorithms could be effectively replaced with a number of different electronic devices known in the art. Such alternative devices might incorporate the use of a micro controller, a field programmable gate array (FPGA), an ASIC, a digital signal processor (DSP), or any other device that could control the ADC and store the data to the non-volatile memory circular buffer. This alternative implementation would also have to process the trigger input from the accelerometer and when required, download the collision data out of the device.

In the embodiment of FIG. 1 an accelerometer 16 is connected to the threshold detection circuitry 21 in order to determine when sufficient force has occurred as to indicate a collision. An accelerometer is an electromechanical device that outputs a signal which corresponds to the level of shock or force that it is exerted on it. Through recent advances in micromachining technology, small monolithic accelerometers are available on a single chip, which helps make this invention possible. Additionally, the price of capacitive accelerometers has decreased greatly in recent years. Typically, a threshold detection circuit is simply an adjustable voltage source input into a comparator. The output of the accelerometer is also input into the comparator and when it exceeds the value of the adjustable voltage source, a digital trigger is sent to the microprocessor to indicate a collision. To avoid requiring hand adjustments, digital-to-analog converters (DAC's) are typically used instead of potentiometers to set the trigger threshold voltage into the comparator. The threshold detection circuitry 21 is connected to the microprocessor 17, to indicate when a collision has occurred.

In the context of automobile collisions, this invention offers a means for any ground transportation vehicle to record an accident in which it has been involved. Since it uses a small circular buffer of memory, once an accident is detected by the accelerometer, multiple frames of data immediately before and immediately after the accident are recorded. This includes one frame which should be the exact moment of impact. This would provide nearly indisputable evidence of the details of any collision.

It will be appreciated that the accelerometer 16 could be any type available on the market today and could be a single, dual, or triple axis type. A single axis accelerometer would only sense impact along one plane such as from the back to the front of the car. A two axis accelerometer would be used to sense impact from the sides of the vehicle as well. And a three axis version would be sensitive to any collision in 3D space around the car. It will also be apparent that the device could be triggered by an alarm, the deployment of an air bag, or some other event detection mechanism.

A data serial port 19 is also connected to the microprocessor so that an external computer may be hooked up to the data transfer connector 20, to download the collision images once an accident has occurred. Any data link from the collision recorder to the outside world would be functionally acceptable, including a parallel port, an infrared link, a laser link, an RF link, a universal serial bus port, a firewire port, or any other convenient means of downloading. In the preferred embodiment a standard RS-232 serial port is desirable since almost all personal computers and many microcontrollers have them. This helps reduce the cost of implementation. The images may be downloaded to a computer as many times as desired via the serial port. The device can then be reset, such as by an authorized service center, and used again. The great advantage of this configuration is that large amounts of data do not have to be permanently stored as would be the case if an expensive video camera were used. It also permits the device to be very small in size since large amounts of storage capacity are not required. In the preferred embodiment the serial port 19 will have a tamper proof seal so that a third party can certify to the integrity of the data. It will be appreciated that additional safety and security features could be added to this device. For example, hardware keys, software codes, or transmitted radio frequency signals to unlock the data so that it may be downloaded could also be incorporated to ensure that the data is genuine.

A power jack 14, is provided so that 12 volt vehicle power may be used to run the device. The 12 Volt DC power 13, is input to a DC to DC converter 12, so that 5 Volt DC power 11, may be obtained to power the device's electronics. It will be appreciated that other embodiments of the present invention may be produced to run on 110 v AC power, or any other common electrical power supply configuration for different applications in different locations. It will also be apparent that if a car is not pre-wired for this device, 12V DC power may be obtained for the unit from the vehicle's cigarette lighter 22 or from some other source. When the device is triggered, a light 27 comes on to indicate that an event has occurred. If the unit was hit with a hard object and falsely triggered, this light would indicate such and the unit would need to be replaced or reset.

Figure 2:
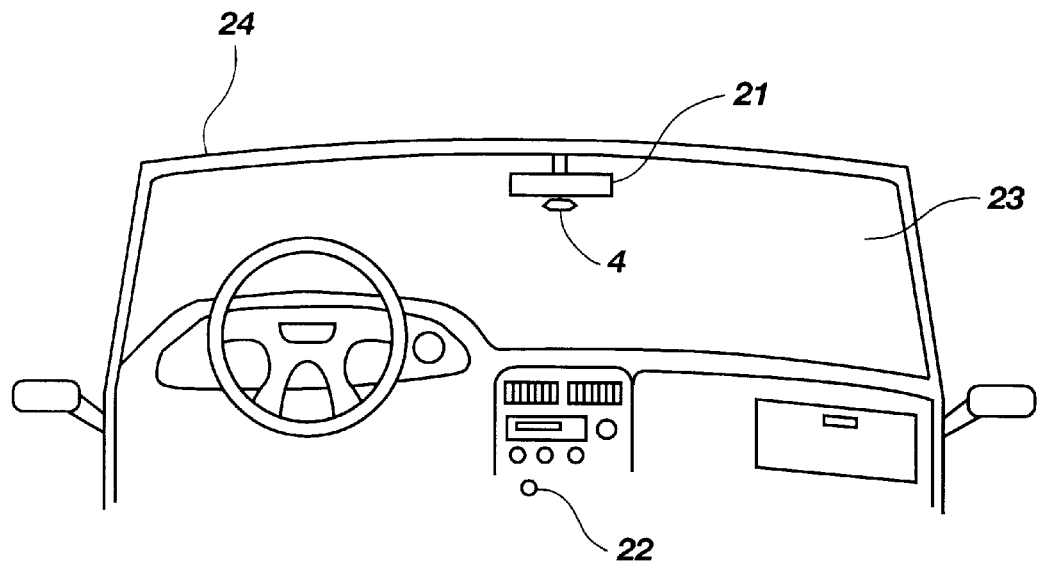
FIG. 2 is an illustration of one method of installing this invention in a motor vehicle.

FIG. 2 is a depiction of how the video recording device of FIG. 1 might be placed in an automobile. Here the vehicle collision recorder 4 is mounted directly below the rear view mirror 21. With its lens pointing forward at the front car window 23, all forward or on-coming events would be recorded when the device is triggered. Placing the device directly below the rear view mirror would give a forward looking lens an excellent view of a front-end collision. It will be appreciated that a camera directed towards the rear or the sides of the automobile would also be effective to capture other types of collisions. Alternatively, a collision camera could be located on the dash board, on the top of the car 24, or in the center of the inside of the car by the dome light and could effectively capture the surrounding images of a collision. It will also be apparent that multiple image sensors could be installed to simultaneously record multiple views of a single event. In fact, with a dual axis accelerometer and 4 image sensors in a device, the front, back, and both sides of the automobile would be monitored during a collision from any direction.

Figure 3:
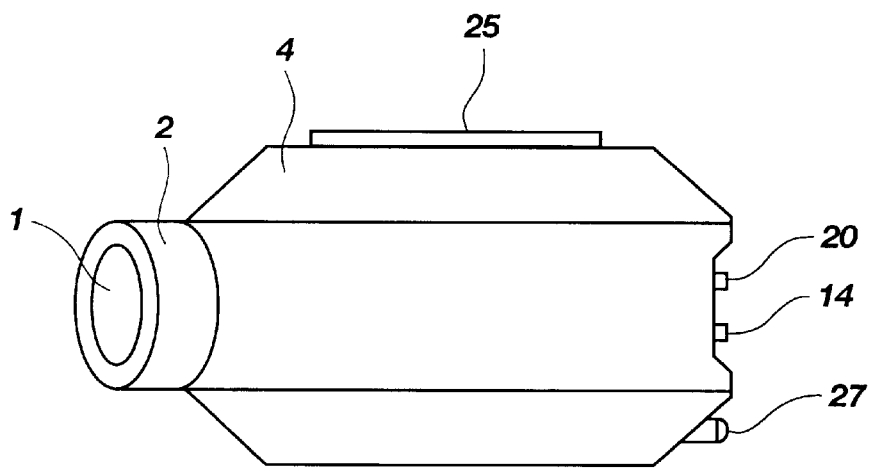
FIG. 3 illustrates one embodiment of the present invention enclosed in a plastic case suitable for consumer use.

FIG. 3 illustrates an embodiment of the invention shown in FIG. 2 enclosed in a plastic case suitable for consumer use. A rigid mounting plate 25, is provided so that the device may be firmly attached to the vehicle. It will be appreciated that a solid mounting plate and firm attachment is required so that the shock of the collision is transmitted to the accelerometer in order to trigger the device, and so that the device records complete details of any accident, and does not change orientation, break or become dislodged by the shock of a vehicle impact. Additionally, the device should be adjusted so that it will not be set off by someone touching it or bumping their head against it. If it is solidly mounted to the car, falsely detected triggering events should not occur. Alternatively, instead of including the accelerometer or other trigger assembly as part of the device, the trigger could be a remote part connected to the device via a wire or cable, and attached firmly to some other part of the automobile, such as against the windshield or inside the frame of the vehicle, so as to ensure a valid trigger. This approach would allow the device itself to be attached less rigidly which would make it easier to remove for data transfer. It will be appreciated that the device could also be provided with fire insulation or other protective features so that the memory is protected in serious accidents even if the unit itself is damaged or destroyed.

The power jack 14 and the serial port connector 20 are the only two external connectors required. The device will preferably be made as small as possible so as not to distract the driver. It will be apparent that the device could be factory or otherwise installed in a vehicle in such a way as to be entirely unobtrusive and completely unnoticeable.

Figure 4:
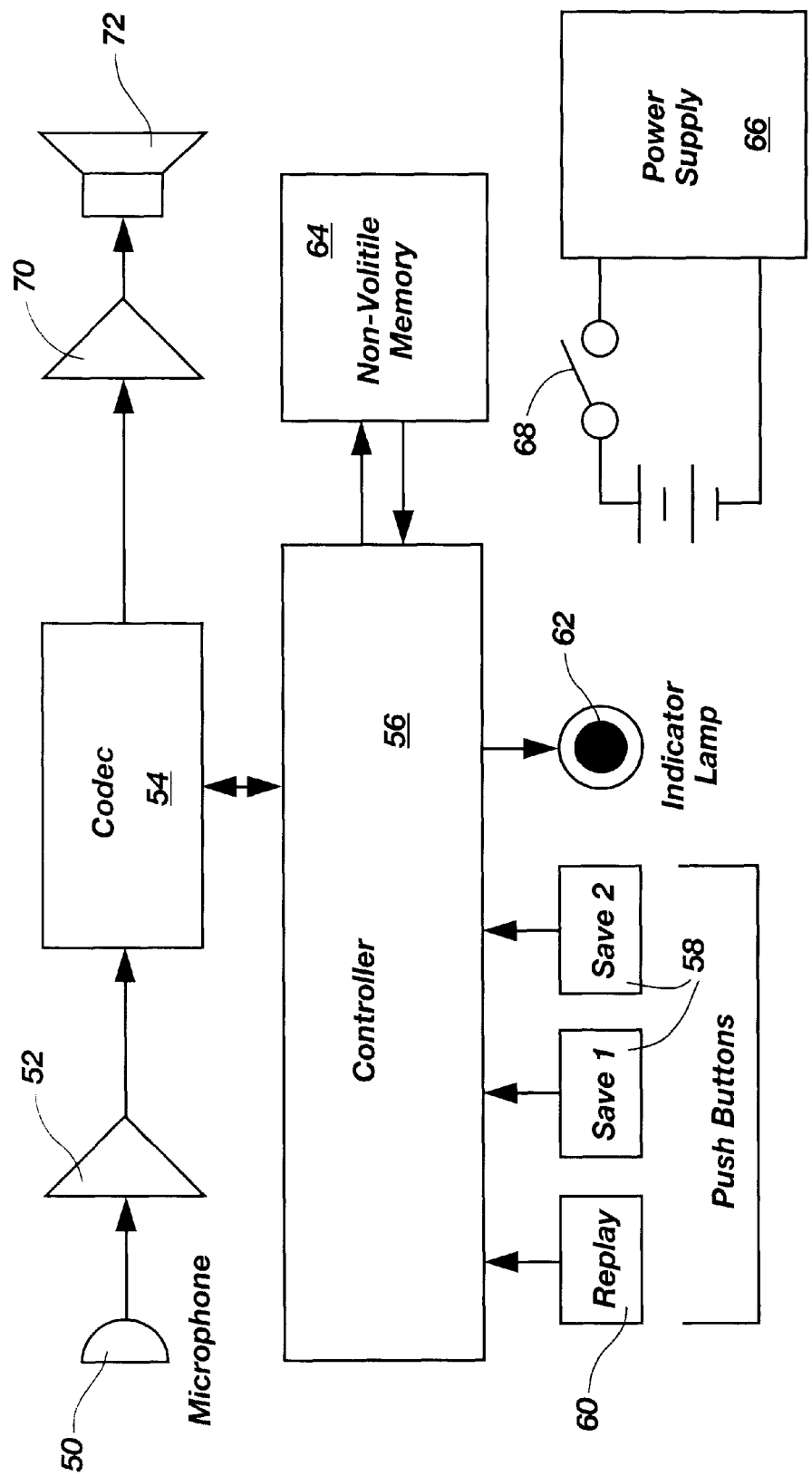
FIG. 4 provides a block diagram of an alternative embodiment of the present invention comprising an acoustical event save device.

FIG. 4 is a block diagram of an alternative embodiment of the present invention adapted to save acoustic events. Aural data is detected by the microphone 50 and translated into a stream of digital data by the microprocessor controlled codec 54. This data is then temporarily stored in the controller 56, which contains a circular buffer of memory that is continuously progressively overwritten until saved. When one of the save buttons 58 is pressed, the contents of the circular buffer are transferred to one of two discrete registers in the non-volatile memory 64, overwriting whatever was previously there. The user pressing one of the save buttons is the triggering event in this embodiment. As shown in FIG. 4 the non-volatile memory contains two discrete memory registers, each controlled by one of the two save buttons. It will be appreciated that the present invention could be composed of any other number of memory registers to allow the saving of any other number of individual aural events as desired. The device is also provided with power supply means 66 and control switch 68 for activating and deactivating the device. The power supply means and control means may be any means currently known in the art, such as that for powering portable dictaphones, tape recorders and the like.

One of the great advantages of this embodiment is that the recorded information may be immediately replayed. As shown in FIG. 4 the codec 54 is connected to an output device such as an amplifier 70 and audio speaker 72, to allow the user to hear the data when replayed. It will be appreciated that connections for headphones, recording devices, and other output devices known in the art may also be used. To replay data stored in one of the registers of the non-volatile memory 64, the user simply presses the play button 60 twice and then a save button 58 for the particular memory register he wishes to hear. Additionally, pressing the replay button 60 once replays what is temporarily stored in the controller 56. This may aid the user in determining whether temporarily stored data is worth saving permanently.

This device thus serves as a convenient method to document such things as verbal agreements, promises, quotes, announcements, names of new acquaintances, verbal harassment or other improper behavior, threats, compliments, etc. At the push of a button it will save some previous time period of acoustical input and digitally store it in memory. It will be apparent that a device as shown in FIG. 4 may be small, portable, and battery powered for maximum convenience.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A device for providing a record of an occurrence close in time to a triggering event, said device comprising:
   a) a data detection apparatus having a location and an orientation, and configured for detecting an occurrence;
   b) control circuitry coupled to the data detection apparatus for developing a stream of electronic data representing a continuous sequence of data inputs in real time;
   c) a data storage bank coupled to the control circuitry for receiving the data inputs in real time and retaining the electronic data, said data storage bank having a first memory address and a last memory address and being of a size sufficient to store all data input for a desired pre-set time interval;
   d) an event detection mechanism responsive to a triggering event and coupled to the control circuitry for sensing occurrence of the triggering event;
   e) activation means coupled to the control circuitry for activating the control circuitry to generate the electronic data representing the continuous sequence of data inputs in real time;
   f) a control algorithm and processor coupled to the control circuitry for (i) storing the electronic data representing the continuous sequence of data inputs in the data storage bank, (ii) processing the electronic data to progressively write over the electronic data in the data storage bank after the data storage bank has become full, said writing over commencing at the first memory address and proceeding to the last memory address, and (iii) discontinuing storing electronic data in the data storage bank after detection of the triggering event so as to capture in the data storage bank a record of the continuous sequence of video images of the occurrence over a time interval adjacent to the occurrence of the triggering event, based upon the time of occurrence of the triggering event and independent of the location and orientation of the data detection apparatus; and
   g) means for downloading the electronic data from the data storage bank to a means for perceiving the data.

2. A device as defined in claim 1, further comprising nonvolatile memory into which the electronic data from the data storage bank is transferred after detection of the triggering event so as to create a permanent record, said nonvolatile memory having a capacity at least equal to the capacity of the data storage bank.

3. A device as defined in claim 2, further comprising more than one discrete section of nonvolatile memory, each discrete section having a capacity at least equal to the capacity of the data storage bank, such that multiple sets of data from the data storage bank may be independently saved in permanent form upon repeated occurrence of triggering events.

4. A device as defined in claim 1 wherein the time interval recorded includes time both before and after detection of the triggering event.

5. A device as defined in claim 4 further comprising means for selectively adjusting the relative proportions of the time interval before and after the triggering event up to a maximum total time length depending upon the capacity of the data storage bank.

6. A device as defined in claim 1 wherein the detection apparatus is a video detection apparatus.

7. A device as defined in claim 6, wherein the video detection apparatus is placed within an automobile and oriented in a direction of movement of the vehicle.

8. A device as defined in claim 7 wherein a sudden jolt involving the automobile is the triggering event.

9. A device as defined in claim 7, further comprising means for developing a stream of electronic data representing traffic flow within the vicinity of the vehicle, and for recording that data synchronosly with the said continuous sequence of data inputs in real time.

10. A device as defined in claim 7, further comprising means for developing a stream of electronic data representing operational conditions of the vehicle, and for recording that data synchronously with the said continuous sequence of data inputs in real time.

11. A device as defined in claim 7, further comprising more than one detection device installed in the vehicle, each detection device oriented in a unique direction.

12. A device as defined in claim 1 wherein the detection apparatus is an audio detection apparatus.

13. A device as defined in claim 12 wherein the detection apparatus is sound activated.

14. A device as defined in claim 12 wherein the event detection mechanism may be selectively triggered by a user.

15. A device as defined in claim 12 further comprising an audio playback mechanism coupled to the data storage bank whereby the recorded data may be selectively and immediately replayed.

16. A device as defined in claim 1 wherein the event detection mechanism is configured to detect chosen occurrences selected from the group comprising an earthquake, an avalanche, a lightening strike, a flash of light, motion of objects nearby, a shooting star, a tornado, a volcanic eruption, conditions of heat, conditions of cold, conditions of vibration, and a loud noise.

17. A device as defined in claim 1 wherein the event detection mechanism may be selectively triggered by a user.

18. A method for providing a record of an occurrence close in time to a triggering event, said method comprising:
   a) orienting a data detection apparatus in such a way as to detect an occurrence;
   b) coupling the data detection apparatus to control circuitry for developing a stream of electronic data representing a continuous sequence of data inputs to the data detection apparatus in real time;
   c) coupling a data storage bank to the control circuitry for receiving the electronic data in real time and retaining the electronic data, said data storage bank having a first memory address and a last memory address, and being of a size sufficient to store all data input for a desired pre-set time interval;
   d) linking an event detection mechanism to the control circuitry with a detector for sensing occurrence of a triggering event;
   e) activating the control circuitry to generate the electronic data representing the continuous sequence of data inputs in real time;
   f) storing the electronic data representing the continuous sequence of data inputs in the data storage bank, said storage beginning at the first memory address and proceeding sequentially to the last memory address;
   g) processing the electronic data with control software coupled to the control circuitry and data storage bank to progressively write over the electronic data in the data storage bank after the data storage bank has become full, said writing over commencing at the first memory address;
   h) detecting actual occurrence of the triggering event with the event detection mechanism;

i) discontinuing storing electronic data in the data storage bank after detection of the triggering event so as to capture in the data storage bank a record of a continuous sequence of data inputs of the occurrence over a time interval adjacent to the occurrence of the triggering event, based upon the time of occurrence of the triggering event and independent of the orientation of the data detection apparatus;

j) downloading the electronic data from the data storage bank to a means for perceiving the data; and k) resetting the data detection apparatus, the control circuitry, and the data storage bank for detection and storage of another occurrence following detection of another triggering event.

19. A method as defined in claim 18 wherein the data detection apparatus is a video detection device.

20. A method as defined in claim 18 wherein the data detection apparatus is an audio detection device.

* * * * *